April 23, 1968 C. B. PEAR, JR 3,379,060
WIND METER
Filed Oct. 22, 1965
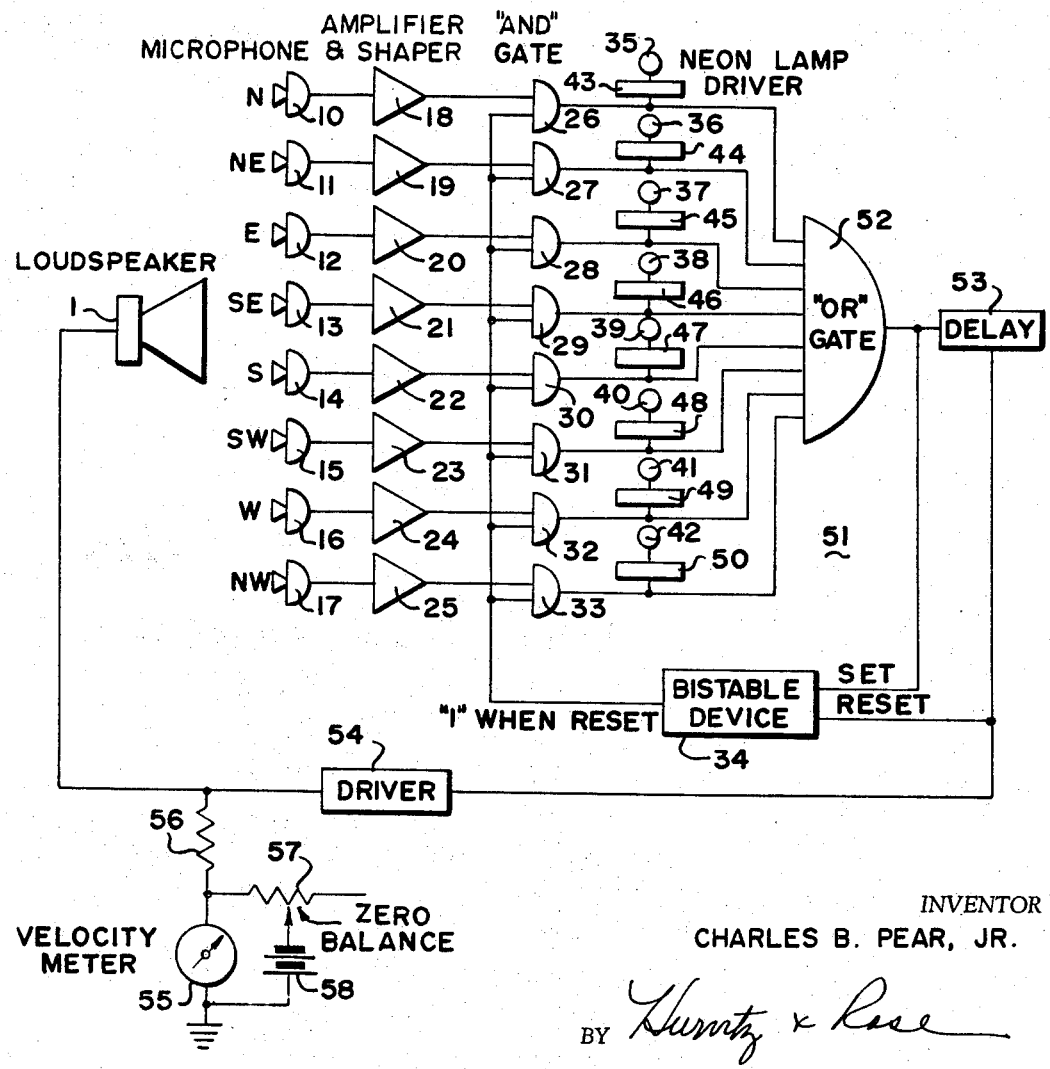
INVENTOR
CHARLES B. PEAR, JR.
BY Hurvitz & Rose
ATTORNEYS

United States Patent Office 3,379,060
Patented Apr. 23, 1968

3,379,060
WIND METER
Charles B. Pear, Jr., Eau Gallie, Fla., assignor to Radiation Incorporated, Melbourne, Fla., a corporation of Florida
Filed Oct. 22, 1965, Ser. No. 501,997
15 Claims. (Cl. 73—189)

ABSTRACT OF THE DISCLOSURE

An instrument for measuring direction and velocity of fluid flow comprising a speaker for transmitting a radially directed sonic pulse to a plurality of microphones disposed equidistant from the speaker along radial paths which are co-planar with the direction of a fluid flow velocity to be measured. The time required for transmission of the pulse between the speaker and microphone depends upon the vectorial flow component along each path. Logic circuitry is provided to indicate which microphone is first to receive the transmitted pulse and also to initiate transmission of another pulse in response to the first received pulse. An indicating circuit is responsive to the repetition rate of the transmitted pulses to provide an indication of flow velocity.

---

The present invention relates generally to meteorological data gathering, and more particularly to apparatus for measuring wind velocity and direction.

Standard types of wind velocity and direction measuring apparatus generally utilize the physical movement of mechanical components which occur in response to the momentum vector of the wind. In the latter type of measuring apparatus, where several moving parts may be exposed to the atmosphere, adverse, or even normal weather conditions may affect the operation and accuracy of the apparatus. Furthermore, where the physical movement of mechanical components is relied upon, the apparatus tends to be mechanically complex, to assure structural stability in adverse conditions. However, increased complexity usually results in decreased reliability and increased cost, both factors being undesirable.

The present invention overcomes these problems by providing a relatively simple electronic system which employs no moving parts, to measure wind velocity and direction.

The present invention is based upon the principle that the transmission time of sound waves in air along a given path is a function of the wind velocity component parallel to that path. If the wind velocity has a component whose direction is the same as the direction of propagation of a sound wave, the transmission time of the sound wave between two points of given separation will be decreased. Similarly, if the wind velocity has a component whose direction is opposite to the direction of propagation of a sound wave, the transmission time of the sound wave between the two points will be increased. Accordingly, if sound waves are propagated in air along a plurality of non-parallel paths, each having the same length and each being coplanar with each other and with the direction of a wind velocity to be measured, the transmission times of the sound waves along each of the paths will vary in accordance with the wind velocity and direction, i.e. whether the wind has a component which is in the direction of propagation or opposite to the direction of propagation along each path.

Briefly describing the present invention, there is provided means for indicating wind velocity and direction which comprises a first electroacoustic transducer for transmitting a pulse of sound along a plurality of non-parallel paths which are co-planar with the direction of a wind velocity to be measured and a plurality of second electroacoustic transducers, one for each of the plurality of paths, spaced concentrically about the first transducer and along said plurality of paths, for receiving the sound pulse transmitted by the first transducer. Associated with each receiving transducer is an indicating means which is energized when a pulse of sound arrives. There is also provided logic circuitry so that when a pulse is received by one of the receiving transducers, only its indicator is actuated and all other indicators are inhibited from operating until the logic circuit is reset. Since there will be only one path which is essentially parallel to the direction of the wind velocity to be measured, the receiving transducer associated with that path will receive the sound pulse before it is received by any of the other receiving transducers, actuating its indicating means to the exclusion of all other indicating means. By observing which indicating means is activated, an indication of wind direction is obtained.

In order to determine wind velocity, the first received sound pulse is operative to generate a new pulse which drives the transmitting transducer after a predetermined fixed delay which is sufficient to allow the preceding sound pulse to have reached all of the receiving transducers under all conceivable weather conditions. By so driving the transmitting transducer, the pulse repetition rate will be a function of the minimum transit time of a sound pulse traveling from the transmitting transducer to one of the plurality of receiving transducers, which time is, of course, directly related to the wind velocity. To obtain wind velocity directly, according to the present invention, the sound pulses which drive the transmitting transducer are integrated to provide a quantity which is indicative of velocity.

It is therefore an object of the present invention to provide a novel wind velocity and direction measuring apparatus.

It is a further object of the present invention to provide wind velocity and direction apparatus which avoids the physical movement of mechanical components.

It is a still further object of the present invention to provide a simple, reliable, electronic device for measuring wind velocity and direction.

It is another object of the present invention to provide wind velocity and direction measuring apparatus in which velocity is indicated as a pulse rate and visual indicators are provided to indicate direction.

It is yet another object of the present invention to provide a wind measuring apparatus with a pseudo-digital output useful for remote indications of wind velocity and direction.

The above and still further objects, features and advantages of the present invention will become apparent upon consideration of the following detailed description of one specific embodiment thereof, especially when taken in conjunction with the accompanying drawings, wherein:

FIGURE 1 is a schematic diagram showing the physical arrangement of the electroacoustic transducers of the present invention; and FIGURE 2 is a circuit diagram, partly in block, showing a preferred embodiment of the present invention.

Referring now to the drawing, and, more particularly, to FIGURE 1 thereof, there is shown an electroacoustic transducer 1, arranged to propagate, along a plurality of non-parallel paths 2–9, a pulse of sound energy. Transducer 1 may conveniently be a speaker with its axis of symmetry normal to the plane of paths 2–9. Paths 2–9 are arranged to be coplanar with the direction of a wind velocity to be measured and would, normally, lie in a horizontal plane. There is also provided a plurality of electroacoustic transducers 10–17 arranged along said paths 2–9 concentrically of said loudspeaker 1. Transducers 10–17 may conveniently be microphones for detecting the pulses of sound transmitted by loudspeaker 1.

With the arrangement of FIGURE 1, if a pulse of sound is transmitted by loudspeaker 1, the transit times of said pulse along paths 2–9 to microphones 10–17 will be functions of the wind velocity and direction. If the wind velocity has a component whose direction is the same as the direction of propagation of sound along any of the paths 2–9, the microphone associated with that path will receive the sound pulse prior to its receipt by the microphones associated with the other paths.

Referring now to FIGURE 2, a preferred embodiment of the present invention is shown for indicating which microphone first receives the sound pulse to indicate wind direction and for utilizing said first received sound pulse to indicate wind velocity. In FIGURE 2, there is shown, connected to said microphones 10–17, a plurality of amplifying and shaping circuits 18–25. Circuits 18–25 are operative to receive an electrical signal from microphones 10–17 indicative of the receipt of a sound pulse and to amplify and shape said signal into a form appropriate to drive a plurality of AND gates 26–33. AND gates 26–33 are arranged to pass or stop the signals from circuits 18–25 according to the state of a bistable device 34 in a manner to be explained hereinafter. Bistable device 34 may conveniently be a conventional multivibrator or flip-flop which is operative to provide a "0" output when a signal is received at its set input terminal and a "1" output when a signal is received at its reset input terminal. Furthermore, AND gates 26–33 only pass signals when bistable 34 provides a "1" output, gates 26–33 being closed to signals from circuits 18–25 when bistable 34 provides a "0" output.

The individual signals passed by AND gates 26–33 are fed to a plurality of indicating neon lamps 35–42 via driving circuits 43–50. Driving circuits 43–50 receive electrical pulses from AND gates 26–33 and selectively turn on neon lamps 35–42 for a predetermined time which is less than the pulse repetition rate of loudspeaker 1.

The circuit described thus far operates as follows. A pulse of sound is transmitted by loudspeaker 1, which pulse, depending upon the direction of the wind, will be received by one of the microphones 10–17 before receipt by the other microphones. If, for example, the wind is due North, microphone 10 will first receive the sound pulse and an electrical pulse will be passed to circuit 18. After amplification and shaping in circuit 18, the electrical pulse will be passed by AND gate 26, bistable device 34 being reset, to neon lamp 35 via driver 43 to operate neon lamp 35 which indicates a northerly wind direction.

It can readily be seen that some means must be provided for deactivating the remainder of lamps 36–42 as soon as a signal is received by lamp 35 or else each lamp will be activated each time a pulse is transmitted resulting in no usable indication of direction. For the purpose of rendering all but one of the lamps non-responsive to a transmitted sound pulse, a logic circuit is provided indicated generally by the numeral 51. Logic circuit 51 comprises an OR gate 52, a delay device 53, said bistable device 34 and said AND gates 26–33. The outputs of AND gates 26–33 are commonly connected to the input of OR gate 52 which passes the first received pulse to the set input of bistable device 34. This first received pulse triggers bistable device 34 to provide a "0" output which is fed to AND gates 26–33 to block all received pulses after the first. In this manner, the first pulse received by any of microphones 10–17 energizes its associated lamp and inhibits all others from operating until bistable 34 is reset. This provides an indication of wind direction.

In order to reset bistable device 34, the output of OR gate 52 is fed to a delay device 53 which delays the first received pulse by an amount which is sufficient to allow the transmitted pulse to reach all of the microphones under all conceivable weather conditions. This delayed pulse is then fed to the reset terminal of bistable device 34 to trigger the latter to provide a "1" output, conditioning said AND gates 26–33 for the next transmitted pulse.

In order to obtain an indication of wind velocity, the delayed output from device 53 is applied to driver 54 which generates a new pulse upon receipt from delay 53 of the next preceding pulse. This establishes a ring-around transmission cycle in which the pulse repetition rate is determined by the loudspeaker to microphone distance and the delay in device 53. In the absence of a wind velocity, this pulse repetition rate will be constant. However, with wind present, the transmitted pulse will be received by one of the microphones after a delay which is less than that which would occur in the absence of wind, the transit time being a function of the wind velocity. Since the first received pulse is used to generate the next pulse, after a predetermined constant delay, the pulse repetition rate will be a function of the minimum transit time which, of course, is directly proportional to the wind velocity. In order to convert the pulse repetition rate into an indication of velocity, the pulses from driver 54 are integrated in velocity meter 55 which gives a direct indication of velocity.

In order to have meter 55 give a zero reading when there is no wind, a fixed component which is a function of the predetermined delay in device 53 and the loudspeaker to microphone distance must be balanced out. This is accomplished by resistors 56 and 57 and voltage source 58 which bias meter 55 to read zero with no wind. In order to adjust for any inherent delays in the system, resistor 57 is made variable to act as a zero adjusting element.

The near digital form of the output of the circuit shown in FIGURE 2 makes the present invention ideally suited for remote indications of wind velocity and direction. This is particularly so in the case of remote indicating meteorological stations such as buoys or ground-based automatic stations now being considered by the Weather Bureau. In this field, the simple, stationary external form would also be of great advantage. Specifically, the output of delay device 53 would be transmitted to a remote location to give an indication of wind velocity, and the outputs of AND gates 26–33 would be transmitted to give an indication of wind direction.

Since the transmission time of a pulse of sound energy in air between two points is also a function of air temperature, humidity and pressure, additional circuits to correct for these variables might be added if greater accuracy is desired, but a simple indication under "normal" conditions would not need these additional components. Correction tables could also be applied without departing from the true spirit and scope of the present invention.

Although eight microphones have been shown in FIGURE 1, it will be understood by those skilled in the art that any number could be used depending upon the required accuracy. For example, four microphones could be used but the velocity indication would be off by as much as 30% when the direction of the wind is halfway between two microphones. More than eight microphones might also be used, but this hardly seems worthwhile in view of the normal variations in wind direction near the ground.

Although loudspeaker 1 has been described as being in the same plane as microphones 10–17, it should be understood that it need not be so located. Loudspeaker 1 may be arranged either above or below the plane of microphones 10–17, the only requirement being that it be equidistant from each of the microphones.

While I have described and illustrated one specific embodiment of my invention, it will be clear that variation of the details of construction which are specifically illustrated and described may be resorted to without departing from the true spirit and scope of the invention as defined in the appended claims.

What is claimed is:
1. Apparatus for measuring direction of fluid flow comprising:
   means for transmitting a sound wave along a plurality of non-parallel paths in said fluid;
   a plurality of means, one for each of said paths, spaced equidistant from said transmitting means along said paths and coplanar with the direction of motion of the fluid to be measured, for receiving said transmitted sound wave, the transit time for said sound wave to travel from said transmitting means to each of said plurality of receiving means being a function of fluid direction;
   means associated with said plurality of receiving means for indicating which of said plurality of receiving means is first to receive said transmitted sound wave, thereby providing an indication of direction of flow; and
   means responsive to the first received sound pulse for triggering said transmitting means to cause another sound pulse to be transmitted.

2. The combination of claim 1 wherein said means for transmitting comprises:
   an electro-acoustic transducer for converting electrical energy into sound energy; and
   means for driving said electro-acoustic transducer with electrical signals.

3. The combination of claim 2 wherein said electro-acoustic transducer is a loudspeaker.

4. The combination of claim 1 wherein said plurality of receiving means comprises:
   a plurality of electro-acoustic transducers for receiving and converting said sound wave into an electrical signal.

5. The combination of claim 4 wherein said plurality of electro-acoustic transducers consists of a plurality of microphones.

6. The combination of claim 1 wherein said means for indicating comprises:
   a plurality of indicating devices coupled one for one to said plurality of receiving means for indicating which of said plurality of receiving means first receives said transmitted sound wave; and
   a logic circuit operative upon the actuation of the first of said plurality of indicating devices for inhibiting actuation of the remainder of said plurality of indicating devices.

7. The combination of claim 6 wherein said logic circuit comprises:
   a plurality of gates, each having an input terminal, an output terminal and a gating terminal;
   means connecting a different one of said plurality of receiving means to a different one of said input terminals;
   means connecting a different one of said plurality of lamps to a different one of said output terminals;
   means for combining the outputs of all of said plurality of gates;
   means connected to said combining means and to said gating terminals and responsive to the first signal passed by any of said plurality of gates for disabling said plurality of gates; and
   means connected to said combining means and to said gating terminals and responsive a predetermined time after said first signal is passed by any of said plurality of gates for enabling said gates.

8. Apparatus for measuring velocity and direction of fluid flow comprising:
   means for transmitting a pulse of sound energy along a plurality of non-parallel paths in said fluid;
   a plurality of means, one for each of said paths, spaced equidistant from said transmitting means along said paths and coplanar with the direction of the fluid velocity to be measured, for receiving said transmitted sound pulse, the transit time for said sound pulse to travel from said transmitting means to each of said plurality of receiving means being a function of fluid velocity and direction;
   means associated with said plurality of receiving means for indicating which of said plurality of receiving means is first to receive said transmitted sound pulse thereby giving an indication of fluid direction;
   means responsive to the first received sound pulse for triggering said transmitting means to cause another sound pulse to be transmitted, whereby the pulse reptition rate of said transmitting means is directly proportion to the minimum transit time for a sound pulse to travel from said transmitting means to one of said plurality of receiving means; and
   means coupled to said last mentioned means for integrating said pulse repetition rate to give an indication of fluid velocity.

9. The combination of claim 8 wherein said means for transmitting comprises:
   an electro-acoustic transducer for converting electrical energy into sound energy; and
   means for driving said electro-acoustic transducer with electrical signals.

10. The combination of claim 8 wherein said plurality of receiving means comprises:
    a plurality of electro-acoustic transducers for receiving and converting said sound pulse into an electrical signal.

11. The combination of claim 8 wherein said means for indicating comprises:
    a plurality of lamps coupled one for one to said plurality of receiving means for indicating which of said plurality of receiving means first receives said transmitted sound pulse; and
    a logic circuit operative upon the actuation of the first of said plurality of lamps for inhibiting actuation of the remainder of said plurality of lamps.

12. The combination of claim 11 wherein said logic circuit comprises:
    a plurality of gates, each having an input terminal, an output terminal and a gating terminal;
    means connecting a different one of said plurality of receiving means to a different one of said input terminals;
    means connecting a different one of said plurality of lamps to a different one of said output terminals;
    means for combining the outputs of all of said plurality of gates;
    means connected to said combining means and to said gating terminals and responsive to the first signal passed by any of said plurality of gates for disabling said plurality of gates; and
    means connected to said combining means and to said gating terminals and responsive a predetermined time after said first signal is passed by any of said plurality of gates for enabling said gates.

13. The combination of claim 12 wherein said means for integrating said pulse repetition rate comprises:
    a pulse responsive meter for giving an indication which is directly proportional to the spacing between pulses applied thereto; and further comprising:
    means coupled to said meter for adjusting said indication to read zero in the absence of a fluid velocity.

14. The combination of claim 8 wherein said means for integrating said pulse repetition comprises:
    a pulse responsive meter for giving an indication which is directly proportional to the spacing between pulses applied thereto; and further comprising;
    means coupled to said meter for adjusting said indication to read zero in the absence of a fluid velocity.

15. Apparatus for measuring direction of fluid flow comprising:
    means for transmitting a sound wave along a plurality of non-parallel paths in said fluid;

a plurality of means, one for each of said paths, spaced equidistant from said transmitting means along said paths and coplanar with the direction of motion of the fluid to be measured, for receiving said transmitted sound wave, the transit time for said sound wave to travel from said transmitting means to each of said plurality of receiving means being a function of fluid direction; and means associated with said plurality of receiving means for indicating which of said plurality of receiving means is first to receive said transmitted sound wave, thereby providing an indication of direction of flow; wherein said indicating means comprises:

a plurality of lamps coupled one for one to said plurality of receiving means for indicating which of said plurality of receiving means first receives said transmitted sound waves, and a logic circuit operative upon the actuation of the first of said plurality of lamps for inhibiting actuation of the remainder of said plurality of lamps wherein said logic circuit comprises:

a plurality of gates, each having an input terminal, an output terminal and a gating terminal;

means connecting a different one of said plurality of receiving means to a different one of said input terminals;

means connecting a different one of said plurality of lamps to a different one of said output terminals;

means for combining the outputs of all of said plurality of gates;

means connected to said combining means and to said gating terminals and responsive to the first signal passed by any of said plurality of gates for disabling said plurality of gates; and means connected to said combining means and to said gating terminals and responsive a predetermined time after said first signal is passed by any of said plurality of gates for enabling said gates.

References Cited
UNITED STATES PATENTS

| | | | |
|---|---|---|---|
| 2,266,172 | 12/1941 | Davis | 73—188 X |
| 2,534,712 | 12/1950 | Gray | 340—5 |
| 3,176,263 | 3/1965 | Douglas | 73—69 X |

OTHER REFERENCES

Corby, R. E.: Acoustic Anemometer-Anemoscope, in Electronics, Jan. 1950, pp. 88–90, TK 7800.E58, copy in 340-5(S).

RICHARD C. QUEISSER, *Primary Examiner.*

JAMES J. GILL, *Examiner.*

JERRY W. MYRACLE, *Assistant Examiner.*